July 13, 1937.  H. A. STRELOW  2,086,969

VENT ASSEMBLAGE

Filed March 26, 1936

INVENTOR.
Henry A. Strelow
BY Morsell, Lieber & Morsell
ATTORNEYS.

Patented July 13, 1937

2,086,969

UNITED STATES PATENT OFFICE 2,086,969

VENT ASSEMBLAGE

Henry A. Strelow, Milwaukee, Wis., assignor to The Heil Co., Milwaukee, Wis., a corporation of Wisconsin Application March 26, 1936, Serial No. 70,983

6 Claims. (Cl. 277—60)

The present invention relates in general to improvements in pressure relief devices for containers, and relates more specifically to improvements in the construction and operation of so-called vent valve assemblages especially applicable to truck tanks for transporting liquids such as gasoline and oil.

Generally defined, an object of the present invention is the provision of an improved vent which is simple, compact and durable in construction, and which is moreover highly efficient in use.

When relatively volatile liquids such as naphtha or gasoline are being transported in bulk in large containers such as truck tanks, they tend to gasify and thereby create considerable internal pressure within the containers. When such containers are tightly sealed and some of the liquid is withdrawn, a partial vacuum will tend to form above the confined liquid, thereby subjecting the exterior of the tanks to undesirable external pressure. It therefore becomes desirable to provide means for automatically relieving the internal and the counteracting external pressures without introducing fire hazard and also without permitting undesirable escapes of the liquid. While various types of pressure relief and venting devices have heretofore been proposed, most of these prior devices are objectionable, either because they are too complicated, or because they do not function properly under all conditions of use. For example, the more successful of the prior pressure relief valves, embody numerous coacting casing sections which require accurate and costly machining; and the vacuum breaker valves of these prior assemblages, which must necessarily be relatively large but sensitive in operation, are spring suspended in vertical positions so that these valves will readily open by inertia when the tanks are suddenly displaced in a vertical direction as when the trucks pass over irregularities in the road. While the prior assemblages are provided with fire prevention screens, these are usually located between the relief valves and the liquid confining chambers, whereas they should be located between these valves and the ambient atmosphere; and the prior safety valve assemblages are not as effectively protected against damage and tampering, as they should be.

It is therefore a more specific object of the present invention to provide an improved safety relief valve assemblage which will function to effectively meet all conditions of operation, which can be readily manufactured at moderate cost, and which insures maximum safety in actual use.

Another specific object of the present invention is the provision of an improved valve structure having a vent valve so constructed that it will not tend to open accidentally due to inertia induced either by sudden displacement of the valve structure, or by arresting of the motion thereof.

A further specific object of the invention is to provide an improved pressure relief and vent valve unit provided with a properly located and effective fire prevention screen, and which is also thoroughly protected against damage or injury.

Still another specific object of the invention is the provision of an improved vent assemblage which can be readily installed as a unit, and all parts of which are conveniently accessible for inspection.

These and other specific objects and advantages will be apparent from the following detailed description.

A clear conception of an embodiment of the several improved features, and of the construction and operation of vent valve assemblages built in accordance with the invention, may be had by referring to the drawing accompanying and forming a part of this specification wherein like reference characters designate the same or similar parts in the various views.

While the improved vent valve assemblage is shown and described herein as being especially adapted for application to the manhole covers of truck tanks for transporting relatively volatile liquids, it is not the intent to thereby unnecessarily restrict the scope or range of use of the invention.

Figure 1:
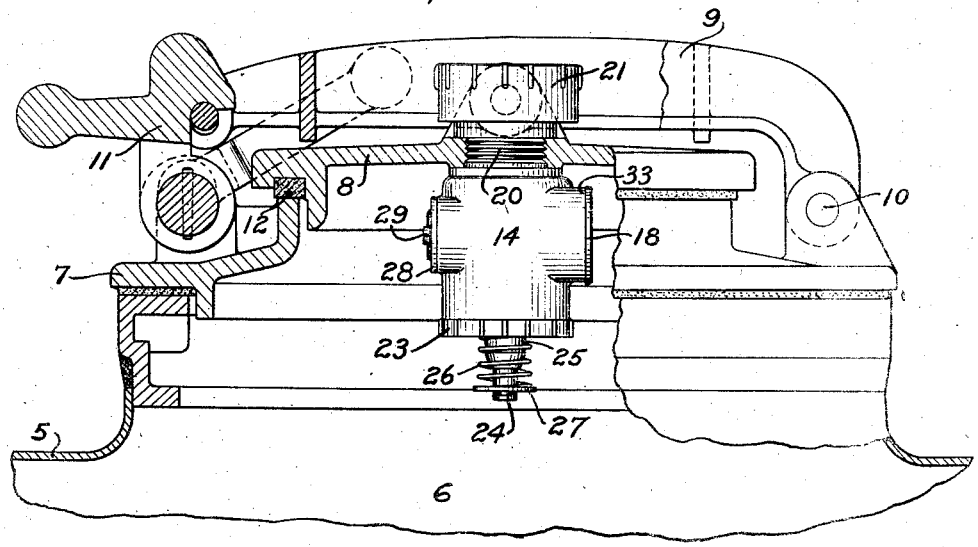
Fig. 1 is a fragmentary part sectional view of the upper portion of a truck tank and one of the manhole covers associated therewith, showing one of the improved vent valve assemblages attached to a section of the removable manhole closure.

Referring to Fig. 1 of the drawing, the truck tank 5 is ordinarily formed of sheet metal and is divided by partitions of usual construction into several liquid confining compartments 6 each of which is provided with a main manhole cover 7 having a separately removable closure plate 8 associated therewith, the plate 8 being pivotally suspended from a lever 9 swingably attached to the cover 7 by means of a pivot 10, and the lever 9 being normally held in sealing position by means of a locking latch mechanism 11 of well known construction. The improved valve unit is detachably secured to the central portion of the closure plate 8, and while this assemblage is normally disposed within the compartment 6, it is also accessible from without by merely releasing the latch mechanism 11 and by subsequently swinging the plate 8 away from its seating 12 with the aid of the suspension lever 9.

Figure 3:
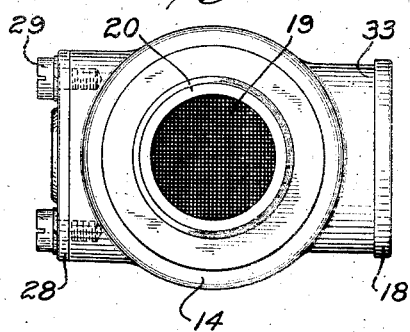
Fig. 3 is a similarly enlarged top view of the valve assemblage, with the clamping and protecting member removed from the upper end thereof.
Figure 2:
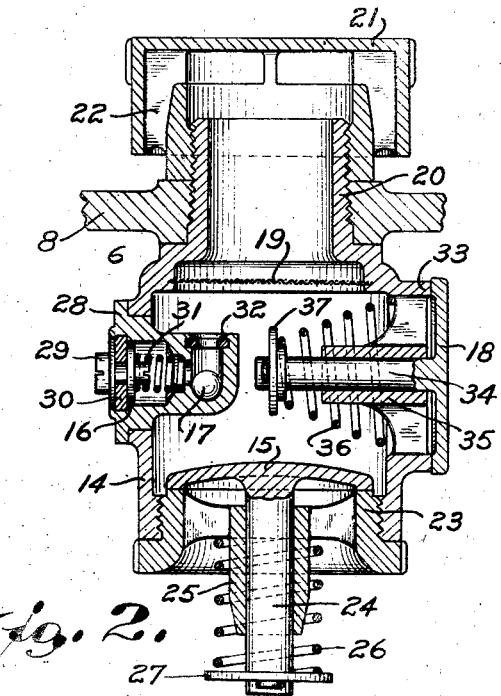
Fig. 2 is an enlarged central vertical section through one of the improved valve assemblages, showing the same suspended from a fragment of the manhole cover.

The new valve assemblage is shown in detail in Figs. 2 and 3, and comprises in general a one-piece main valve casing 14 having four independently functioning valves 15, 16, 17, 18 and a fire prevention screen 19 associated therewith. The main casing 14 is of substantially hollow cylindrical formation, and has an upper integral threaded nipple 20 adapted for coaction with a central threaded opening in the closure plate 8, and with a combined clamping and cover member 21 normally disposed above the plate 8 and provided with passages 22 connecting the interior of the casing 14 and nipple 20 with the ambient atmosphere. The casing 14 may thus be firmly but removably and adjustably suspended from the closure plate 8 within the upper portion of the liquid confining compartment 6, by means of the integral nipple 20 and the clamping member 21, the latter also serving to protect the valve assembly against tampering and ingress of dirt or other foreign matter.

The large high pressure relief valve 15 is of the poppet type and is disposed to move vertically within the lower end of the valve casing 14. This valve 15 coacts with a seating 23 having screw threaded coaction with the internally threaded end of the casing 14, thus permitting convenient removal of the valve 15 and its seating 23 as a unit. The stem 24 of the valve 15 is guided in a central hub 25 formed integral with the seating 23, and the valve 15 is normally urged against its seat by means of a relatively strong compression spring 26 coacting with the stem 24 through a washer 27 and reacting against the seating 23 around the hub 25. The strength of the spring 26 must be sufficient to retain the valve 15 closed in case the tank 5 is inverted and the valve 15 is thus subjected to the full pressure of the liquid within the compartment 6, but abnormally high pressures created within this compartment will compress the spring 26 sufficiently to open the valve 15 and thereby quickly relieve such pressures.

The small internal pressure relief valve 16 and the automatic check valve 17 are mounted in an auxiliary casing 28 which is insertable within the main valve casing 14 through a side opening therein, and is adapted to be fastened to the main casing by means of cap screws 29 as shown in Figs. 2 and 3. The valve 16 is also of the poppet type and normally coacts with a valve seat 30, being pressed against this seat by means of a relatively light coil spring 31. This valve 16 normally functions to quickly and automatically relieve slight internal pressures developed within the compartment 6, which are insufficient to open the larger valve 15. The ball check valve 17 is normally open, but is adapted to move by gravity into engagement with its seat 32 to positively prevent escape of liquid or gas past the small valve 16, when the tank 5 is inverted. It is to be noted, that the provision of the check valve 17 is necessary due to the fact that the spring 31 coacting with the small pressure relief valve 16 is insufficient to resist opening of the latter by the liquid pressure acting thereagainst in case of inversion of the tank 5; and since the valves 16, 17 cooperate in the manner indicated, they may be readily confined in a common casing 28.

The vacuum relief valve 18 coacts with a valve seat 33 formed directly on the side of the main valve casing 14 opposite to the side to which the auxiliary casing 28 is attached, and has an integral stem 34 which is slidable in a guiding hub 35 formed integral with the casing 14. This valve 18 is also of the poppet type, and is normally maintained in closed position by means of a coil spring 36 one end of which coacts with a washer 37 secured to the stem 34 and the opposite end of which reacts against the casing 14 as shown in Fig. 2. The valve 18 is adapted to open into the compartment 6 to admit air from the outside, whenever the pressure within this compartment drops below atmospheric sufficient to compress the spring 36; and it is to be noted that by locating the valve 18 on the side of the casing 14 diametrically opposite to the casing 28, machining of the casing 14 is greatly facilitated. The horizontal disposition of the axis of the valve 18 is also important, since a suitable spring 36 may thus be utilized without danger of having the valve 18 opened at undesirable times by the inertia thereof.

The valves 15, 16, 17, 18 just described obviously function independently of each other and perform their functions automatically in order to meet predetermined operating conditions. The fire prevention screen 19 is secured within the main valve casing 14 at a point between the valves 15, 16, 17, 18 and the outlet passage leading to the ambient atmosphere, and the valve assemblage may obviously be positioned so that the axis of the valve 18 extends either longitudinally or transversely of the tank 5. During normal operation of the improved valve assemblage, one of which is normally applied to the manhole cover of each compartment 6 of the tank 5, the small pressure relief valve 16 will normally operate to release slight internal pressures produced by volatilization of the confined liquid or otherwise; and the vacuum relief valve 18 will likewise operate to counteract all external pressures caused by withdrawal of liquid from within the compartment 6. When the internal pressure relief valve 16 becomes inoperative or when the capacity thereof is insufficient to meet requirements, the larger internal pressure relief valve 15 will automatically function to relieve the internal pressure, this valve being of sufficient capacity to prevent dangerous internal pressures from being created within the compartment 6 under any conditions. The larger relief valve 15 and the vacuum relief valve 18, will remain closed during accidental inversion of the tank 5, and if the small internal pressure relief valve 16 opens upon inversion of the tank 5, liquid will be prevented from escaping from within the compartment 6 by virtue of the fact that the ball check valve 17 will automatically close by gravity.

From the foregoing detailed description it will be apparent that the present invention provides a simple, compact and highly efficient valve assemblage for automatically relieving both internal and external pressures on the tank 5, under any condition of operation, without permitting undesirable escape of liquid from within the compartment 6. The improved valve assemblage can be readily manufactured and installed, and all of the independently functioning valves 15, 16, 17, 18 are readily accessible by virtue of their detachable mounting in the main casing 14. The coacting valve 16, 17 may be applied to and removed from the casing 14 as a unit, and the horizontal disposition of the vacuum valve 18 prevents this valve from being opened by inertia during transportation of the truck tank 5. The location of the fire prevention screen 19 between the valves and the exterior of the tank, permits this screen to most effectively perform its function, and the entire valve assemblage is effectively protected by the clamping member 21.

It should be understood that it is not desired to limit the invention to the exact details of construction and to the precise mode of operation herein shown and described, for various modifications within the scope of the claims may occur to persons skilled in the art.

I claim:—

1. A vent valve assemblage especially applicable as a single unit to liquid transporting tanks, said assemblage comprising, a one-piece casing having a single upper suspension portion, a vertically movable high pressure relief valve carried by the lower portion of said casing, a horizontally movable low pressure relief valve carried by an upper side portion of said casing, and a spring pressed vacuum relief valve carried by the opposite upper side portion of said casing, said vacuum relief valve being movable along a substantially horizontal axis in alinement with said low pressure relief valve.

2. A vent valve assemblage especially applicable as a single unit to liquid transporting tanks, said assemblage comprising, a substantially cylindrical hollow casing having an upper suspension portion provided with an opening communicating with the atmosphere, a high pressure relief valve detachably secured to the lower end of said casing and movable along the central vertical casing axis, a low pressure relief valve detachably secured to an upper side portion of said casing and movable along a substantially horizontal axis, and a vacuum relief valve carried by the opposite upper side portion of said casing and movable along the axis of movement of said low pressure valve.

3. A unitary vent valve assemblage for movable tanks, comprising, a hollow one-piece casing formed for suspension within the tank and having an opening through its suspension portion communicating with the atmosphere, a high internal pressure relief valve carried by said casing, a vacuum relief valve carried by said casing independently of said high pressure valve, an auxiliary casing carried by said hollow casing in alinement with said vacuum relief valve but independently of said valves, and a low pressure relief valve and a check valve confined within said auxiliary casing, said auxiliary casing being removable to permit access to said vacuum relief valve.

4. A unitary vent valve assemblage for movable receptacles, comprising, a casing having an upper suspension portion, a vertically movable high pressure relief valve carried by the lower portion of said casing, a horizontally movable low pressure relief valve carried by a side portion of said casing between said suspension portion and said high pressure relief valve, and a vacuum relief valve carried by the opposite side portion of said casing and being movable in substantial alinement with said low pressure relief valve.

5. A unitary vent valve assemblage for movable receptacles, comprising, a hollow casing having an upper suspension portion provided with an opening connecting the casing interior with the atmosphere, an upwardly movable high pressure relief valve having a seat secured to the lower end of said casing, a low pressure relief valve secured to one side of said casing between said suspension portion and said high pressure relief valve seat, and a vacuum relief valve carried by the opposite side of said casing, said low pressure relief valve and said vacuum relief valve being movable laterally of said casing and in substantial alinement with each other.

6. A unitary vent valve assemblage for movable receptacles, comprising, a hollow one-piece casing having an upper hollow suspension portion connecting the casing interior with the atmosphere, a vertically movable high pressure relief valve having a supporting seat detachably secured to the lower end of said casing, a low pressure relief valve detachably secured to one side of said casing between said suspension portion and said high pressure valve seat, and a vacuum relief valve having a supporting seat detachably secured to the opposite side of said casing, said low pressure relief valve and said vacuum relief valve being movable horizontally in substantial alinement with each other.

HENRY A. STRELOW.